Jan. 13, 1953 P. A. NOXON ET AL 2,625,348
AUTOMATIC PILOT
Filed Dec. 31, 1943 4 Sheets-Sheet 1

INVENTORS
Paul A. Noxon
Alan M. MacCallum
Norman B. Murphy.
BY
ATTORNEY

Jan. 13, 1953 P. A. NOXON ET AL 2,625,348
AUTOMATIC PILOT
Filed Dec. 31, 1943 4 Sheets-Sheet 3

INVENTORS
Paul A. Noxon
Alan M. MacCallum
Norman B. Murphy
BY
ATTORNEY

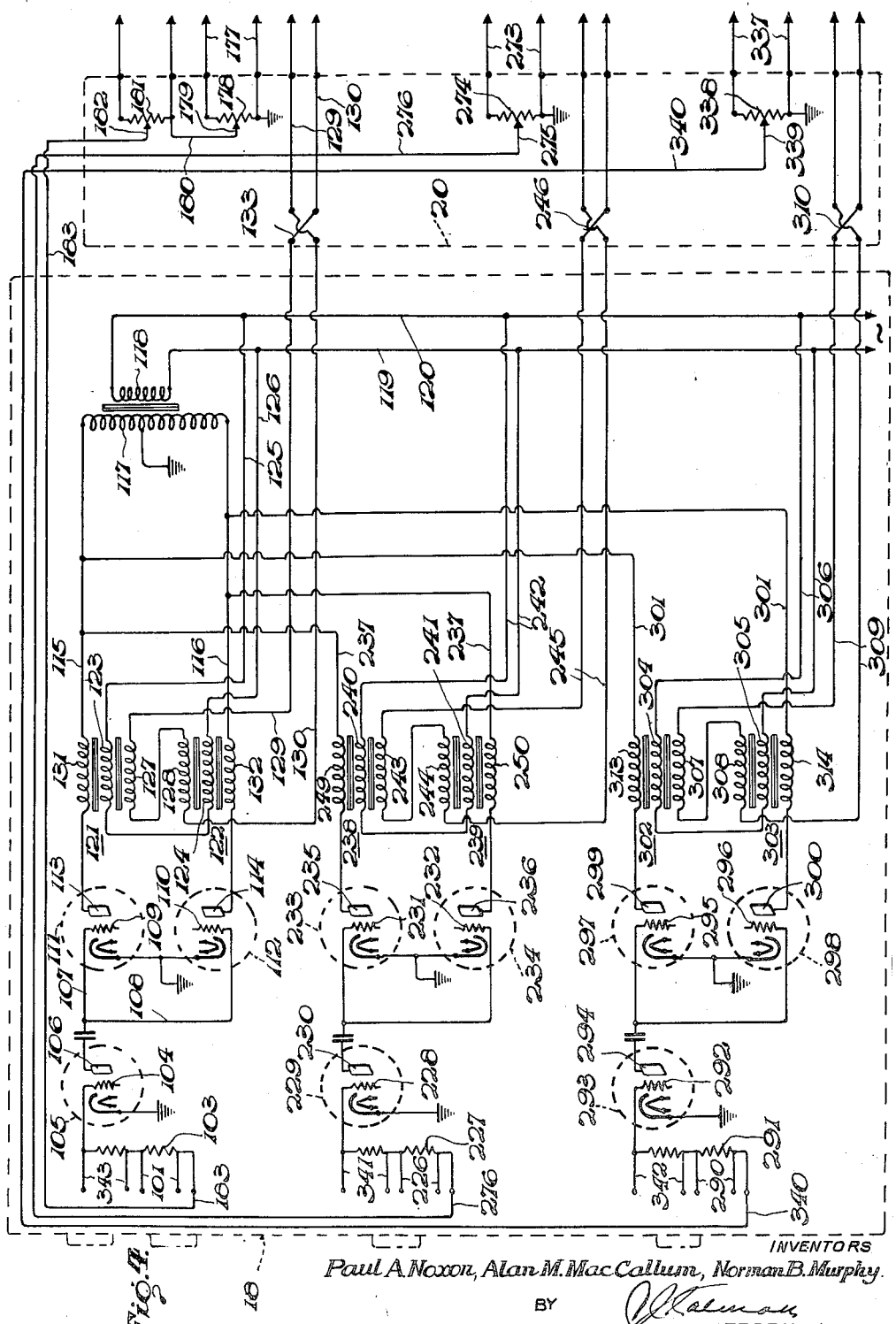

Patented Jan. 13, 1953

2,625,348

UNITED STATES PATENT OFFICE 2,625,348

AUTOMATIC PILOT

Paul A. Noxon, Tenafly, Alan M. MacCallum, Maywood, and Norman B. Murphy, West Englewood, N. J., assignors to Bendix Aviation Corporation, Teterboro, N. J., a corporation of Delaware Application December 31, 1943, Serial No. 516,488

19 Claims. (Cl. 244—77)

The present invention relates to an automatic pilot adapted for use with dirigible craft and one which may be applied equally as well to the automatic steering of both air or water craft.

Various devices have been provided, heretofore, for this general purpose, but all have been subject to certain undesirable characteristics. For example, where a displacement signal for controlling a rudder surface is derived from a directional gyroscope, errors tend to arise in the signal because the gyro will not remain fixed in a predetermined and set position. Such departure from course may occur from bearing friction, etc. Therefore, various resetting expedients have been provided and the human pilot must, at regular intervals, check the directional gyro against a magnetic compass to ascertain whether or not a departure from course has occurred. If a deviation has taken place, the human pilot must manipulate the resetting means to bring the gyro back to a desired position.

Known automatic steering systems, furthermore, generally rely on either pneumatic or hydraulic pressures, or a combination of both for operating servo motors. Where widely varying altitudes are traversed, the wide change in air densities affects the reliability of pneumatic systems while extreme changes in temperatures produce undesirable effects on hydraulic systems. Moreover, the numerous conduits required in such pressure systems are particularly vulnerable to gun fire when the automatic pilot is provided on aircraft used for war purposes.

An object of the present invention, therefore, is to provide a novel and improved automatic pilot with the use of which the foregoing disadvantages are overcome.

Another object of the invention is to provide a novel all electric automatic pilot for aircraft of all sizes and uses, i. e., private and passenger ships, cargo ships, ships of war, etc., with the use of which outstanding ease of control and complete maneuverability are obtained. The advantages surrounding an all electric automatic pilot will immediately become apparent. For example, high altitudes and dust laden atmospheres do not hinder the operation of such a system. Moreover, the various electrical units are, to a certain extent, self-heating so that no difficulty is encountered in their operation at low temperatures.

A further object of the invention is to provide a novel automatic pilot in which the displacement signal for each axis of control is derived from a related electrical instrument and transmitted to operate an electric servo motor of the related control surface so that a rapid response on the part of all the necessary control surfaces is obtained.

Another object is to provide a novel automatic pilot of the above-described nature in which the various displacement signals may be readily added algebraically thereby making possible the free use of derivates and superimposed controls whenever and wherever required.

A further object is to provide a novel automatic pilot in which standard electrical instruments may be used providing a compact and symmetrical flight group of uniform size which may be readily installed and operated separately, without installing the automatic pilot.

Yet another object is to provide a novel automatic pilot having a novel directional reference in the form of a magnetic pick-up device which combines the accuracy of a remote reading compass with freedom from acceleration errors such as are generally present when a directional gyroscope is used for directional control. This feature has the distinct advantage to the human pilot in that a given magnetic course will be followed indefinitely without the necessity for constant resetting, although other features of the invention may be utilized in an automatic pilot having any type of directional reference or control.

A further object of the present invention is to provide a novel all electric automatic pilot for aircraft wherein, due to the fact that the electrical signals have in themselves no lag and since the rotating parts of the servo motors have low inertia, the positioning of the control surfaces in response to signals is extremely rapid and practically instantaneous. The importance of this feature lies in the fact that the displacement signals call for and get a servo position rather than a servo velocity so that once the proportions have been set to an optimum value for the craft characteristics, the value remains satisfactory for all conditions of loading, air speed and turbulence.

Another object is to provide a novel automatic pilot which is free of hydraulic or pneumatic conduits, mechanical interconnections between the units and follow-up cables so that it is easily and rapidly installed. Moreover, the servomotors are provided with rotating output shafts rather than sliding members so that they may be installed in any desired position and connected to related control surfaces in any desired manner.

Another and further object of the invention is to provide a novel all electric, substantially contactless, A. C. steering system for dirigible craft.

And still another object is to provide a novel automatic pilot in which a direction displacement signal and a rate signal may be combined algebraically to operate a control surface, a follow-back signal being generated upon the operation of the surface which is superimposed upon and modifies the effect of the first two signals.

A further object is to provide an improved and novel all electric automatic pilot providing control about three axes.

A still further object of the present invention is to provide a novel automatic steering system for dirigible craft wherein synchronous operation of the direction reference means and the related control surface is maintained at all times without a mechanical follow-up connection between the reference means and the control surface, an electrical follow-up connection being provided from the control surface to this end.

Another object is to provide an automatic pilot for dirigible craft wherein a servomotor is energized in response to a signal generated as a result of a craft departure from a prescribed and predetermined course to operate a rudder, a follow-back signal being generated as a result of the operation of the motor to modify operation of the motor in accordance therewith, and a rate signal being generated in proportion to the craft's angular velocity developed during off course departure to add to the displacement signal and oppose the follow-back signal so that the rudder is applied more rapidly on the outward swing, a point being reached where the follow-back signal is equal and opposite to the displacement and rate signals to stop the motor and rudder, whereupon the craft begins to return toward its prescribed course. On return, the rate signal is reversed to oppose the displacement signal, but adds to the follow-back signal, whereby the craft is prevented from overswinging from course once it attains that position, a reverse rudder being applied prior to the craft's return to course to provide a braking action thereon.

A further object is to provide a novel automatic control system for an aircraft wherein follow-up signal generators are displaceable by the servomotors, whether the motors are engaged with or disengaged from the craft control surfaces, so that during manual control of the craft surfaces the automatic control system is automatically preconditioned for taking over craft control.

The above and other objects and advantages of the present invention will appear more fully hereinafter from a consideration of the detailed description which follows, taken together with the accompanying drawings wherein one embodiment of the invention is illustrated. It is to be expressly understood, however, that the drawings are for the purpose of illustration and description only, and are not designed as a definition of the limits of the invention.

In the drawings, wherein like reference characters refer to like parts throughout the several views, Figure 1 is a pictorial representation showing generally the arrangement of the various component parts of the present invention in one form of a craft;

Figure 1:
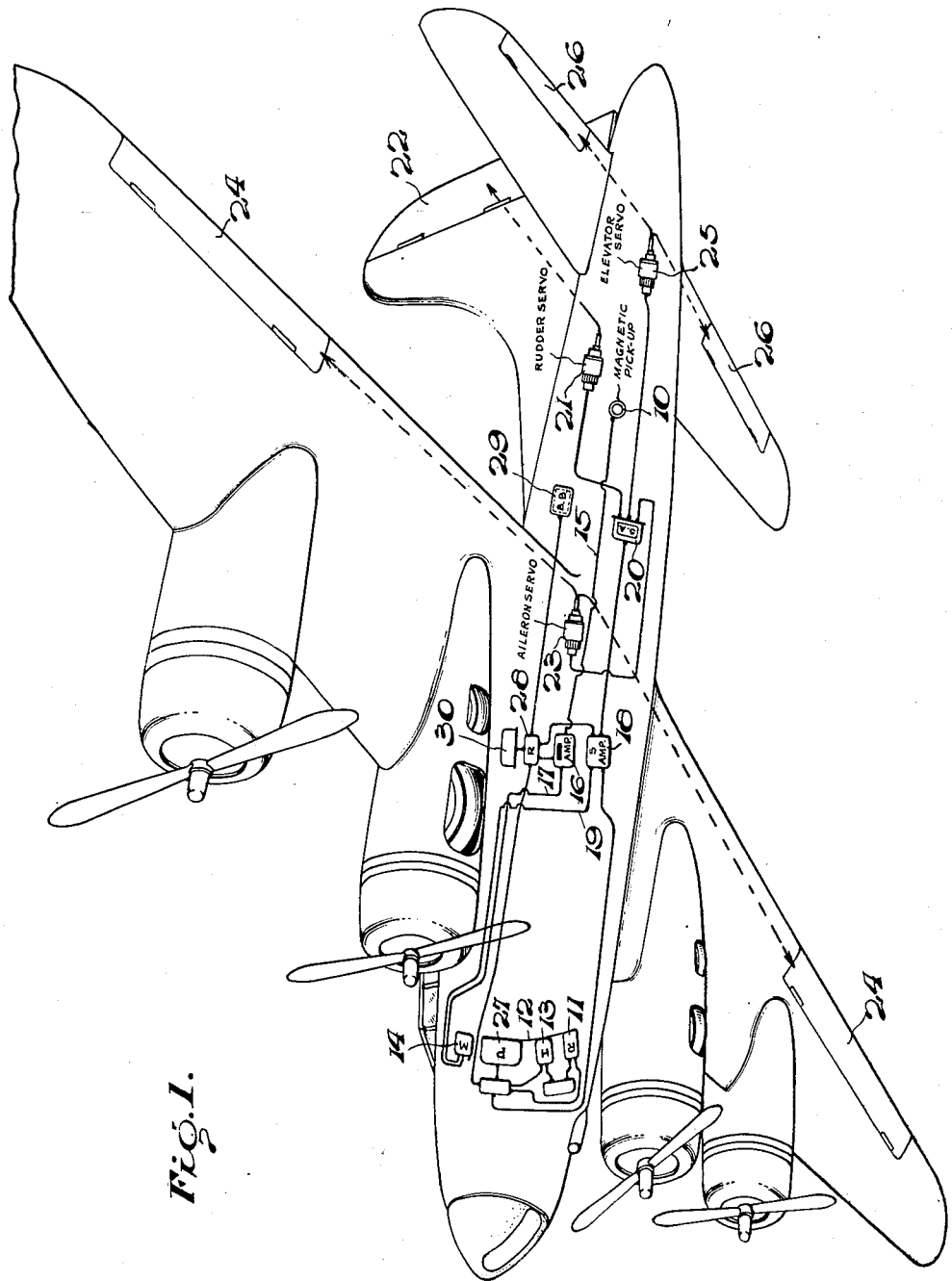

Before entering upon a more detailed description of the novel automatic pilot of the present invention, a general consideration will be first set forth of the composite pilot together with the general location of its various components within one form of a craft to aid in the better understanding of the whole system. To this end reference is made to Figure 1 of the drawings wherein is shown diagrammatically one form of installation of the various parts of the present pilot. For rudder control, a direction displacement signal is derived, in the present instance from a magnetic field pick-up device, in the form of a gyro-stabilized earth inductor compass, housed within a member 10 which may be mounted to the rear of the craft, or in one of its wings, to have freedom from error caused by magnetic disturbances set up in the craft itself. In addition, a rate signal is derived from a rate of turn gyro 11, which may be mounted on a conventional craft panel 12, for modifying the control effected by the displacement signal. For aileron and elevator control, a pitch and bank signal is derived from an artificial horizon gyro 13 also mounted on the panel, both the horizon gyro and the rate gyro acting, as well, as visual indicators of craft attitude.

The craft panel also supports a master indicator 14 which connects, by way of suitable cables 15 and 17, with the pick-up device as well as with a conventional vacuum tube amplifier 16, and with a servo amplifier 18 by way of a cable 19. A servo adapter 20 connects with the output of the servo amplifier and is provided with three output legs of its own, one of which leads to a rudder servo 21 suitably connected with a rudder surface 22, another of which leads to an aileron servo 23 suitably connected to drive aileron surfaces 24, and the third of which leads to an elevator servo 25 drivably connected with elevator surfaces 26.

Both the turn indicator instrument 11 and the artificial horizon gyro 13 are interconnected through a novel control panel 27, provided on craft panel 12, with the servo amplifier through a relay box 28, the latter being connected with a suitable battery 29 and an alternator 30.

*Rudder control*

Figure 2:
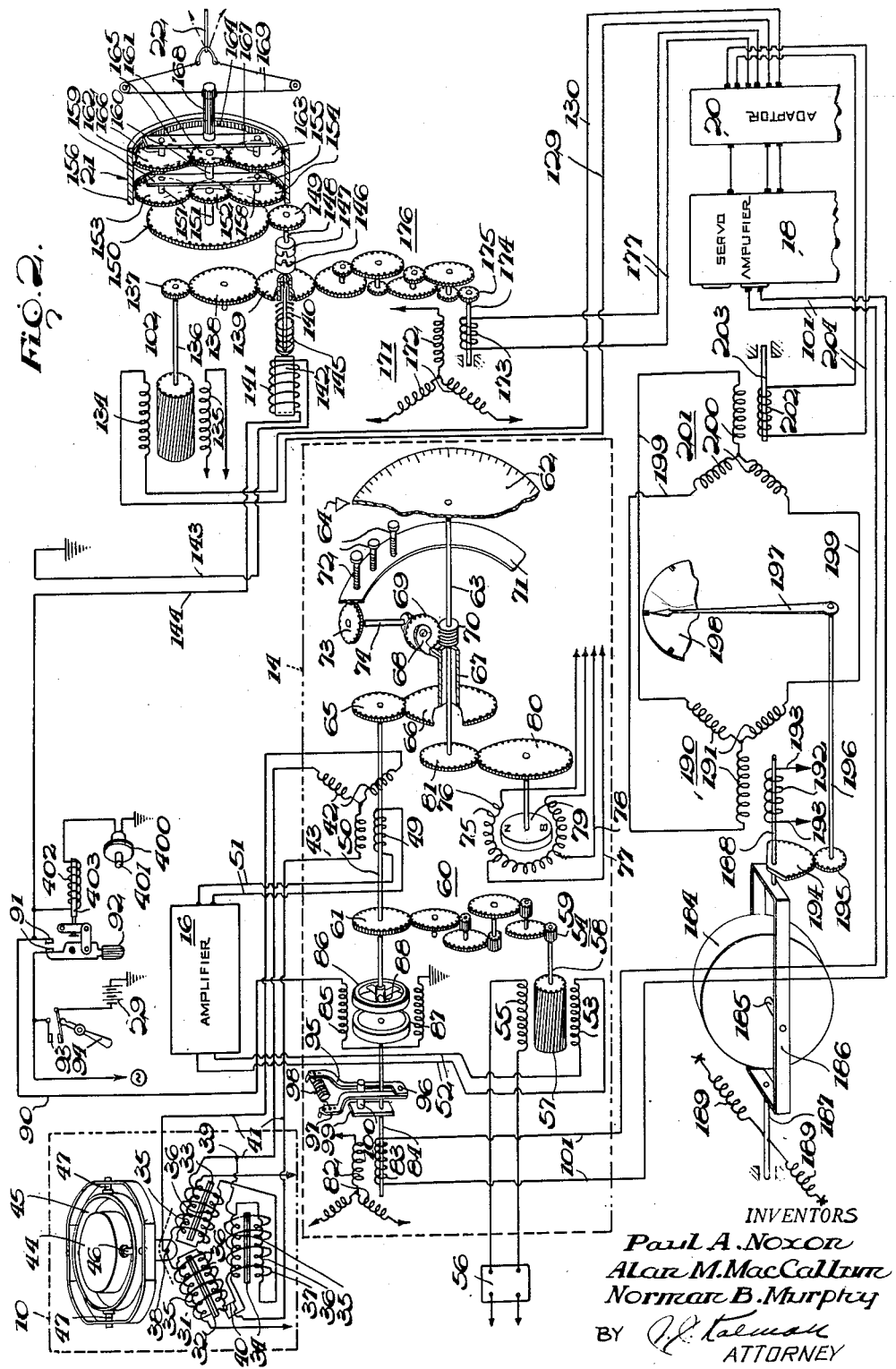
Figure 2 is a diagrammatic illustration of the rudder control system of the present invention.

Referring now to Figure 2 for a more detailed description of the present invention and specifically to rudder surface control, the stabilized pick-up unit within member 10 is shown as comprising a triangular element 31, having laminated legs 32, 33 and 34, each having wound thereon a pair of exciting windings 35, 36 connected in series opposed relation with a suitable source of alternating current such, for example, as alternator 30. The secondary of element 31 comprises a delta connected coil 37 having three taps 38, 39 and 40 which connect by way of suitable leads 41 with the three wound phases of a stator 42 of an inductive coupling device 43 mounted within master indicator 14.

The theory and operation of the magnetic field pick-up device or earth inductor compass is described in greater detail in copending application Serial No. 445,102 filed May 29, 1942, and assigned to the assignee of the present invention. This latter application was abandoned in favor of a continuation application Serial No. 151,402, filed March 23, 1950. For present purposes it is sufficient to state that each leg 32, 33 and 34 is saturated and de-saturated twice for every cycle of the exciting current within primary windings 35, 36 whereby the flux threading each leg, due to the earth's magnetic field, is expelled from and re-enters each leg twice for each cycle of the exciting current. Since the primary windings 35, 36 of each leg are wound in series opposed relation no effect is induced on secondary coil 37 by the exciting current itself. Except at the instant when the exciting current has attained a substantially maximum value, either positive or negative, the earth's magnetic field is free to traverse each leg and as a result voltages are induced at the three taps 38, 39 and 40 of secondary coil 37 differing and dependent in value on the direction in which the pick-up element is positioned with reference to the earth's magnetic field.

The magnetic field pick-up device, therefore, operates as an earth inductor compass in that for every deviation from a prescribed course, however minute, the induced voltages at the three taps of secondary 37 will vary in accordance with the deviation. For a more detailed description of the theory and operation of such pick-up devices reference is made to U. S. Patent No. 2,261,309 issued November 4, 1941, U. S. Patent No. 2,308,566 issued January 19, 1943, and U. S. Patent No. 2,313,682 issued March 9, 1943, all being assigned to the assignee of the present invention.

In order to provide a compass in which turning and acceleration errors are, for all practical purposes, eliminated so that the tendency of the compass to oscillate or overswing is thereby prevented, element 31 of the pick-up device is securely fastened to a rotor casing 44 of a three-degree-of-freedom gyroscope having an electrically driven rotor (not shown), provided with vertical spin axis, mounted within casing 44 which supports the rotor for oscillation about a first horizontal axis within a gimbal ring 45 by way of trunnions 46, the gimbal, in turn, being mounted for oscillation about a second horizontal axis, perpendicular to trunnions 46, within a rigid support defined by member 10, by means of outer trunnions 47. A suitable erection device may be provided for maintaining the rotor spin axis normally vertical as well as a caging apparatus for caging and/or uncaging the gyro whenever desired.

For a condition of equilibrium, i. e., with the craft on course, the voltages within the three windings of stator 42 of coupling device 43 will correspond to the voltages at the three taps of secondary coil 37 of the pick-up device. At the same time, a rotor winding 49 inductively coupled with stator 42 and carried by a shaft 50, suitably journalled within master indicator 14, will be disposed in an angular position with its electrical axis normal to the resultant of the magnetic field of the three windings of the stator so that the voltages in the stator windings have no inductive effect on the rotor winding. As soon, however, as the craft deviates from a prescribed course, the voltages at the three taps of secondary coil 37 will vary causing a variation in the voltages of each of the stator windings. Such change at the stator produces an angular change in the resultant of the magnetic field thereat and, since the electrical axis of the rotor winding is no longer normal to the resultant of the field at the stator, a signal is induced within rotor winding 49 which is proportional to the angle of craft deviation from its prescribed course.

The electrical signal induced within the rotor winding is fed by means of suitable conductors 51 into amplifier 16 and out therefrom by means of leads 52 to one phase winding 53 of a two phase induction motor 54, the second phase winding 55 of which is continuously energized from alternator 30 through a conventional frequency doubler 56. Because, as has been shown, the frequency of the induced currents within secondary 37 is twice the frequency of the exciting current, doubler 56 is included to provide like frequencies in both motor windings and in addition, a suitable phase shifting network is embodied within the doubler so that the phases of the current within the two motor windings will be substantially 90° apart.

Upon energization of phase winding 53, a rotor 57 is actuated which carries a shaft 58 having a pinion 59 thereon meshing through a reduction gear system 60 with a driven gear 61 secured to rotor shaft 50 to drive rotor winding 49 to a null position, i. e., a position wherein the electrical axis of the rotor winding assumes a position normal to the new resultant of the stator field at which point the signal in winding 49 approaches zero and phase winding 53 of motor 54 is de-energized and the motor stops.

In order to provide an indication of the new position or the amount of deviation off course, an indicating dial 62 is provided which is carried by a shaft 63, journalled within master indicator 14, the dial being adapted for angular motion relative to a fixed index 64. Angular motion is imparted to the dial from rotor shaft 50 by way of a gear 65 fastened to the shaft and a gear 66 meshing therewith and having a hollow shaft 67 formed therewith and sleeved about dial shaft 63. An arm 68 is carried by hollow shaft 67 and supports thereon the shaft of a worm gear 69 which meshes with a worm 70, fastened to or formed integrally with shaft 63. Worm gear 69 normally locks with worm 70 so that angular motion on the part of shaft 50 imparts the same motion to shaft 63 and its dial 62.

Because of the iron masses, etc., present aboard a craft, the apparatus thus far described would indicate an apparent rather than a true magnetic heading. To compensate for this error an annular resilient element 71 is provided having spaced thereon approximately every ten or fifteen degrees, screws 72 which upon individual adjustment will define a variable cam track adapted to take into consideration the distortion of the earth's magnetic field as a result of the craft's metallic masses for a 360° swing of the craft. After a ship's swing is taken, the result will be that resilient element 71 will have been depressed inwardly at some points and outwardly at other points. A follower 73 is provided for engagement with element 71 and is supported by an arm 74 fastened to the shaft of worm gear 69. Motion of dial 62 resulting from only the angular motion of rotor shaft 50 would result in an indication of an apparent heading. At the same time, however, that worm 70 is moved, follower 73 is swung angularly along element 71 to pass into a depressed portion thereof, for example, and worm gear 69 is rocked in a clockwise direction which causes an additional rotation of shaft 63 whereby dial 62 is moved to indicate true rather than apparent heading. Obviously, if the follower element engages an outwardly projecting portion of element 71, worm gear 69 will be rocked in a counterclockwise direction to subtract from the total amount of angular motion imparted to shaft 63 and dial 62 by rotor shaft 50. The theory and operation of the foregoing compensating means is more fully described in the aforementioned U. S. Patent No. 2,308,566.

As pointed out above, the ultimate output of shaft 63 is corrected for deviation error and, if desired, the indication of heading may be repeated at one or more remote stations through an electromagnetic device 75 comprising a stator having a single winding 76 provided with input leads from alternator 30, for example, and two output leads 77, 78 together with a magnet rotor 79 inductively coupled with the stator and having a shaft provided with a gear 80 thereon for meshing with a gear 81 splined to the free end of shaft 63. Motion of shaft 63 is thus reproduced at remote stations by movement of rotor magnet 79 therewith whereby a voltage relation is set up in leads 77, 78 which is reproduced at the remote station within a similar stator coil having a rotor magnet inductively coupled therewith and connected to drive indicating means thereat. This system of reproducing motion is more fully set forth in copending application Serial No. 410,343 filed September 10, 1941, now United States Patent No. 2,342,637 issued February 29, 1944, and assigned to the assignee of the present invention.

The electric signal generated by the magnetic field pick-up device during craft deviation from its predetermined course is utilized to operate the craft rudder surface 22 to return the craft to its predetermined course. To this end, an inductive transmitting device is provided having a three phase wound stator 82 connected for energization by alternator 30 and a wound rotor 83 inductively coupled therewith. Rotor 83 is carried by a shaft 84, suitably journalled within master indicator 14, and arranged preferably coaxially with rotor shaft 50. Since shafts 84 and 50 are normally disconnected, a novel magnetic clutch is provided for interconnecting them so that angular motion of rotor 49 and its shaft 50 will cause a corresponding movement of rotor 83.

The novel clutch comprises a suitable coil 85 surrounding a pair of clutch faces 86 and 87 formed of magnetic material, one of the clutch faces being fastened through a resilient coupling or spider 88 to rotor shaft 50 and the other of which is securely fastened to shaft 84. Coil 85 is grounded at one end and at its other ends connects with battery 29 through a suitable conductor 90, contacts 91 of a servo clutch switch 92, to be described more fully hereinafter, and contacts 93 of a power switch 94. Thus, when switch 94 is in its "on" position with contacts 93 closed and switch 92 is also in its "on" position with its contacts 91 closed, coil 85 is energized causing clutch face 86 to move axially, relative to shaft 50, into engagement with clutch face 87 against the yieldable action of coupling 88. A driving connection is thus established between the two shafts and the ultimate result is that as rotor 49 is driven to its null, rotor winding 83 is displaced relative to the resultant magnetic field at stator 82 and an electric signal becomes available in winding 83 corresponding to the amount of craft departure from its predetermined course. The novel magnetic clutch is more fully described and claimed in copending application Serial No. 513,421, filed December 8, 1943, now Patent No. 2,407,757 issued September 17, 1946, assigned to the assignee of the present invention.

If for some reason the automatic pilot is disconnected and the human pilot reverts to manual control, switch 92 is opened and coil 85 is deenergized whereupon clutch face 86 is urged back to a normal position away from clutch face 87 by means of resilient coupling 88. If, at the moment of pilot disengagement, transmitter rotor 83 is in a displaced position relative to stator 82, it will so remain and continue to have a signal therein because, of itself, it is unable to return to a zero electrical position, i. e., one wherein the electrical axis of rotor winding 83 will be normal to the resultant of the magnetic field at stator 82. With the existence of such a signal, a subsequent engagement of the automatic pilot would result in a non-synchronous condition between the direction displacement signal and rudder 22. Novel means are, therefore, provided to bring rotor winding 83 back to its null or zero position whenever the automatic pilot is disconnected, such means comprising a lever arm 95 pivoted on a pin 96 together with a second lever arm 97 also pivoted on the same pin, the free ends of both arms being interconnected through a resilient member 98. A bracket 99 is fastened to shaft 84 and is provided with a pin 100 positioned in between arms 95, 97 so that upon clockwise rotation of shaft 84, pin 100 will urge arm 95 outwardly when a turning torque is exerted on shaft 84, the spring returning the arm and pin to neutral when the torque is no longer applied, i. e., when the clutch is disconnected, while upon a counterclockwise rotation of shaft 84, pin 100 urges arm 97 outwardly, the arm returning pin 100 to neutral under the action of element 98 when the turning torque is released. In the foregoing manner, rotor 83 of the inductive transmitting device will always be at an electrical zero just prior to the engagement of the automatic pilot. This structure assists in the synchronization of the automatic pilot and surface controls automatically to thereby prevent sharp jolts and other undesirable effects when the automatic pilot is thrown in and constitutes the subject matter more fully described and claimed in copending application Serial No. 516,490, filed December 31, 1943, and assigned to the assignee of the present invention.

The signal generated within rotor winding 83 of the inductive transmitting device, in the manner heretofore explained, is led off by suitable conductors 101 to servo amplifier 18 and out therefrom through servo adapter 20 to one phase of a two-phase induction motor 102 of rudder servo 21 to be explained more fully hereinafter. Conductors 101 carrying the direction signal are connected across a resistor 103 of amplifier 18, better shown in Figure 4, which, in turn, connects with a grid 104 of a suitable vacuum tube 105. Plate or anode 106 of tube 105 connects through two parallel paths defined by conductors 107 and 108 with grids 109 and 110 of two tubes 111 and 112, the plates 113 and 114 of the latter tubes being connected by way of conductors 115, 116 with a split secondary winding 117 of a suitable transformer whose primary winding 118 connects with a suitable source of alternating current such as, for example, alternator 30, by way of conductors 119 and 120.

Magnetic reactors, generally designated at 121 and 122, are provided between each plate 113 and 114 and its related connection with secondary winding 117. Each reactor comprises a soft iron core (not shown) having primary windings 123 and 124 connected in series and with the current source through conductors 125 and 126 which may be tapped to conductors 119, 120 for this purpose. Furthermore, each reactor is provided with a secondary winding 127 and 128 which are connected in series opposed relation, for a purpose to presently appear, and having output leads 129 and 130. In addition to the primary and secondary windings, each reactor is provided with a saturating winding 131 and 132 connected with leads 115 and 116.

When the craft is on its prescribed course, i. e., with no apparent deviation being present, the signals at both grids 109 and 110 are zero so that the network is balanced and the current at output leads 129 and 130 of secondaries 127 and 128 is zero because the secondaries are in series opposed relation so that induced currents in one secondary balance the induced currents in the other secondary. A deviation from course may now be assumed wherein the direction signal generated will be of such nature that when communicated to grids 109 and 110 of tubes 111 and 112 it will pass from a zero to a positive maximum value. At that instant it may be assumed that current at plate 113 of tube 111 passes from a zero to a positive maximum value. If this be true, then the current at plate 114 of tube 112 will be passing from a zero to a negative maximum value so that no current flows in lead 116. Current, however, of a pulsating nature will flow within lead 115 and, therefore, within saturating winding 131. As a result of such current flow, the core of reactor 121 will become saturated so that currents induced in secondary winding 127 will be decreased in value causing an unbalance in the network thereby creating a current flow at output leads 129 and 130 in one direction.

If the craft departure from the prescribed course is in a direction opposite to that hereinabove considered, the direction signal impressed on grids 109 and 110 will be of such a nature that it will pass from a zero to a negative maximum value so that no current will flow at plate 113 but will flow at plate 114 and within lead 116. In this event, the core of reactor 122 will become saturated thereby decreasing the currents induced within secondary 128 and the network will again become unbalanced whereby current will flow at output leads 129 and 130 in an opposite direction. The foregoing constitutes a discrimination feature which determines the direction of rotation of the rudder servo to be presently described.

Output leads 129 and 130 connect through a suitable reversing switch 133, located within servo adapter 20, with one phase winding 134 (Figure 2) of two phase motor 102, whose other phase winding 135 is connected for constant energization with the craft's source 30 of alternating current. Motor 102 is the driving means for the rudder servo 21 and is provided with a shaft 136 carrying thereon a pinion 137 adapted for meshing with a gear 138, the latter meshing with a gear 139 which is keyed to a shaft 140, the shaft being adapted for longitudinal motion relative to gear 139.

Associated with shaft 140 is a solenoid 141 having a suitable core 142 which engages the free end of the shaft. The winding of the solenoid is grounded at one end by means of a conductor 143 and connects at its other end with servo clutch switch 92 by way of a conductor 144. With the switch in its "on" position, solenoid 141 is energized forcing its core outwardly against the action of a spring 145, interposed between gear 139 and an enlarged portion of shaft 140, to move shaft 140 outwardly together with a clutch face 146, fastened to the shaft, to engage a corresponding clutch face 147 whereby a driving connection is established between motor 102 and clutch face 147. The latter face is mounted on a shaft 148 which carries at its free end a gear 149 in mesh with a large gear 150 carried by a shaft 151.

A speed reduction gear system is driven by gear 150 and comprises a sun gear 152, carried by shaft 151, which drives two planet gears 153 and 154, both meshing with an internally toothed portion 155 of a relatively stationary servo casing 156. Planets 153 and 154 carry, by way of studs 157 and 158, a cage 159 which supports thereon a shaft 160 provided with a second sun gear 161. The latter sun gear also meshes with two planets 162 and 163 which likewise engage with a second toothed portion 164 formed internally of casing 156. Moreover, planets 162 and 163 carry a second cage 165 by way of studs 166, 167. Although additional stages of speed reduction may be readily provided, cage 165 is shown as supporting a driving shaft 168 which is adapted for driving rudder surface 22 through suitable connections such as cables 169.

Novel means are now provided for generating a follow-back signal when motor 102 is energized to operate the rudder for the purpose of modifying operation of the motor and thereby define an electrical follow-up connection between the rudder and the pick-up device. To this end, an inductive follow-back device 171 is provided having a three phase wound stator 172 connected for energization with alternator 30, and an angularly movable rotor having a winding 173 thereon inductively associated with the stator and carried by a shaft 174 having a pinion 175 thereon. Rotor winding 173 is moved angularly in accordance with the operation of motor 102 by virtue of a speed reduction gearing, generally designated by reference numeral 176, engaging gear 139 and pinion 175 of the rotor. Normally, rotor winding 173 is maintained in a null position, i. e., one in which the electrical axis of the rotor winding is normal to the resultant magnetic field at the stator. Motion from the null position on the part of the rotor winding, during operation of motor 102, causes the inducement of a signal within rotor winding 173 which is led off and impressed upon grid 104 of tube 105 by way of suitable conductors 177, through a resistor 178 (Figure 4), arranged within adapter 20, grounded at one end, an adjustable contact 179, lead 180, across a second resistor 181, whose purpose will presently appear, a second adjustable contact 182 and a conductor 183 to be superimposed upon the direction signal generated by the pick-up device. The signal generated within rotor winding 173 is in opposition to the direction displacement signal and increases with rudder deviation as a result of continued operation of motor 102 until a given point is reached, at which time the signal within rotor winding 173 is exactly equal and opposite to the direction signal to thereby "wash out" the direction signal at which time motor 102 is de-energized and the rudder has reached a deflected position in proportion to the direction signal.

With the rudder in its applied position and motor 102 de-energized, the craft begins to return to its predetermined and prescribed course. In doing so, the direction signal generated by the pick-up device starts to diminish in value while the follow-back signal of rotor winding 173, being at a maximum, becomes predominating and energizes motor 102 in a reverse direction to start bringing the rudder back to a neutral position, motor reversal being determined by current flow in an opposite one of saturating windings 131 or 132 to the one having current flow therein upon initial craft departure from course as explained hereinabove. With reverse operation of motor 102, the signal in rotor winding 173 diminishes until the rotor attains its null wherein, unless another direction signal is being generated by the pick-up device, the rudder and the direction signal generating means are in synchronism. This condition of synchronism is desirably obtained without the provision of mechanical follow-up connections in the nature of cables, for example, between the rudder and the pick-up device. The foregoing novel feature is attained by providing the inductive follow-back device 171 on the same side of the servo clutch that motor 102 is located and to be operated purely from the motor and independently of rudder position. This specific method of obtaining the desired condition of synchronism differs from that derived by the use of the yieldably centered transmitter 82, 83 hereinabove discussed.

The use of a direction signal alone to control the rudder will invariably result in oscillations in that the craft, as it is brought back on course, tends to overswing, only to be brought back on course once more and then overswing in the original direction of departure. It is true that the oscillations will gradually disappear, but the net result is to cause the craft to weave about its course rather than to remain steadily thereon.

By impressing upon the direction signal, another signal that is dependent on the craft's angular velocity or rate of turn, it is at once possible to control craft oscillation whereby dead beat steering and extreme stability under all weather conditions can be obtained. To this end, a rate of turn gyro is provided which comprises an electrically driven rotor 184 (Figure 2) having normally horizontal spin axis and mounted by way of suitable inner trunnions 185 within a gimbal ring 186, the latter being mounted by way of outer trunnions 187, 188 for oscillation about a second horizontal axis perpendicular to the spin axis. Suitable resilient members such as, springs 189, for example, are connected to trunnion 187 to yieldably restrain gyro precession to a rate of turn function as is known in the art.

To generate a signal proportional to the rate of craft turn, as determined by the rate gyro, an inductive transmitting device 190 is provided comprising a three phase wound stator 191 and a wound rotor 192 inductively associated with the stator, the rotor being connected by means such as leads 193 with the craft's source 30 of alternating current. Rotor 192, moreover, is mounted on trunnion 188 for angular motion therewith, the trunnion also being provided with a gear sector 194 meshing with a pinion 195 carried by a spindle 196 which supports a suitable pointer 197 at its free end for cooperation with a scale 198 to thereby indicate visually the rate of craft turn.

Stator 191 of transmitting device 190 has a voltage generated in each of its three windings proportional, respectively, to the angular position of each of the windings relative to wound rotor 192 and is connected through suitable leads 199 with a three phase wound stator 200 of an inductive receiver device 201 having a wound rotor 202 inductively associated therewith and carried by an angularly movable shaft 203.

With rotor 192 of the transmitting device in a given position, i. e., one in which the craft has no angular velocity, the electrical axis of receiver rotor 202 will be normal to the resultant magnetic field at stator 200, to the windings of which the voltages of transmitter stator 191 are being communicated, so that no signal is induced within rotor 202. As soon, however, as a departure from course occurs and the craft also acquires an angular velocity, rotor 192 is moved angularly relative to stator 191 producing a change in the induced voltages within each stator winding, the change in voltages being communicated to the windings of stator 200 as a result of which the resultant of the magnetic field at the receiver stator is moved relatively to rotor 202 and a signal is induced therein proportional to the rate of craft turn.

The signal generated within rotor 202 is led off by suitable leads 204 and impressed across resistor 181 of adapter 20 (Figure 4) to be there superimposed upon the follow-back signal generated within rotor winding 173 of device 171 and communicated therewith by way of lead 183 to grid 104 of tube 105. Thus three signals, i. e., direction, rate and follow-back are mixed or added algebraically at grid 104 and act to control operation of induction motor 102. With the foregoing provision and during an initial craft displacement from a prescribed course, the rate signal aids the direction signal and opposes the follow-back signal so that rudder is applied more rapidly than it would be by the direction signal alone and during a return to course the rate signal (the craft's angular velocity now being in an opposite direction) opposes the direction signal but adds with the follow-back signal so that the craft is prevented from overswinging from its prescribed course once it returns thereto. This is in the nature of an anticipatory control which acts to give the rudder a slight deflection in an opposite direction when it approaches "on course" so that it is braked to remain on such course. It is thus apparent that the static rudder position by the foregoing provisions is made to be algebraically proportional to the sum of the rate and direction signals.

By properly adjusting contact 179 (Figure 4) relative to resistor 178 of the servo adapter, the proper factor between rudder angle and signal voltage may be varied at will. Moreover, the amount of rate signal used can be varied by adjusting contact 182 relative to resistor 181. All the variables are thus localized within servo adapter 20 and the purpose of the foregoing adjustments is to match the performance of the automatic pilot to the dynamic characteristics of a given aircraft type so that critical damping of the craft and the automatic system can be obtained.

*Aileron and elevator control*

Signals for the control of the craft about its other two axes, i. e., the bank and pitch axes, are derived from suitable take-offs associated with an artificial horizon gyro. The horizon gyro for this purpose comprises, as better shown in Figure 3, an electrically driven rotor 205 having normally vertical spin axis and mounted within a suitable rotor bearing frame 206 which is supported by way of trunnions 207 for oscillation about a horizontal axis within a gimbal ring 208, the latter being mounted by way of an outer trunnion 209 for oscillation about a second horizontal axis perpendicular to the first axis. The instrument is so arranged that its outer trunnion 209 is parallel with the fore and aft axis of the craft to thereby define the bank axis while trunnions 207 are parallel with the craft's transverse axis to thereby define the pitch axis. The gyro may be used as a conventional artificial horizon and to this end a horizon bar 210 may be provided adapted for up and down motion relative to a mask 211 suitably connected to the bank axis defined by trunnions 209. Bar 210 is connected to a lever 212 pivoted at 213 and provided with an elongated slot 214 with which cooperates a pin 215 carried by an arm 216 secured for angular motion with pitch trunnions 207.

To the end that an electric signal for controlling aileron surfaces 24 may be generated at the artificial horizon proportional to the angle of craft bank, an inductive transmitting device 217 is provided having a three phase wound stator 218 and a rotor winding 219 inductively associated therewith and mounted upon trunnion 209 for angular motion therewith. Rotor winding 219 is connected to the craft's source of alternating current 30 and for a no bank condition certain voltages are generated in each of the stator windings dependent upon the angular position of each of the windings relative to the rotor. Transmitting stator 218 is connected by suitable conductors 220 with a three phase wound stator 221 of an inductive receiver device 222 which has inductively associated therewith a rotor winding 223. The rotor winding is supported by a shaft 224 for angular motion relative to stator 221.

For a no bank condition, the normal position of receiver rotor winding 223 is such that its electrical axis is perpendicular to the resultant of the magnetic field at the stator. As soon, however, as the craft banks, transmitter rotor 219 moves angularly with trunnion 209 to thereby change the induced voltages in stator 218, the change being communicated to receiver stator 221 causing the resultant magnetic field at the latter stator to revolve relative to the receiver rotor whereupon a signal proportional to the amount of craft bank is induced within rotor winding 223 which is fed by suitable conductors 226 across a resistor 227 (Figure 4) of servo amplifier 18 and impressed on grid 228 of a vacuum tube 229. A plate 230 of the tube connects through two parallel paths with the grids 231 and 232 of tubes 233 and 234, the plates 235 and 236 of the latter tube connecting through conductors 237 across conductors 115, 116 with opposite ends of split secondary 117.

Interposed in each of the plate circuits are magnetic reactors 238 and 239 both comprising soft iron cores (not shown) having wound thereon two primary windings 240 and 241 connected in series with each other and with the craft's source of alternating current 30 by way of leads 242 tapped to conductors 119, 120. Secondary windings 243 and 244 are also provided which are arranged in series opposed relation and have output leads 245 which connect through a reversing switch 246, arranged within the servo adapter, with one phase winding 247 of a two phase induction motor 248 (Figure 3) provided for controlling aileron surfaces 24.

Saturating windings 249 and 250 are provided for the reactors of Figure 4 whose function is to determine the direction of rotation of motor 248. As described in connection with the first network accommodating the direction and rate signals, the bank signal, depending upon the direction of craft bank, will generate a pulsating current within one or the other of saturating windings 249 or 250 so that the induced currents within either secondary winding 243 or 244 are diminished and current will flow in one direction or another at output leads 245 to energize phase 247 of motor 248, the second phase 251 thereof being continuously energized from the craft's source of alternating current.

As in the case of rudder control, a servo clutch 252 is provided for establishing a driving connection between motor 248 and an aileron control shaft 253, the latter being drivably connected to aileron surfaces 24 by way of suitable cables 255. Clutch 252 comprises two clutch faces 256 and 257, one of which drivably connects with aileron control shaft 253 through suitable reduction gearing 258, of the nature hereinabove described in connection with rudder control, supported within a stationary servo casing 259, and the other of which is carried by a shaft 260 adapted for axial movement relative to a gear 261 keyed for rotatable movement therewith. A solenoid coil 262, having one end grounded by means of a lead 263 and connected with switch 92 by way of a lead 264, is energized when the switch is in its "on" position whereupon solenoid core 265 is urged outwardly, against the action of a yieldable member 266, interposed between gear 261 and an enlarged portion of shaft 260, to engage and move shaft 260 outwardly to urge clutch face 256 carried thereby into driving engagement with clutch face 257.

In order to dampen the movement of the aileron surfaces, an inductive follow-back device 267 is provided having a three phase wound stator 268, suitably connected to the craft's source of alternating current, and a rotor winding 269 inductively associated therewith, the rotor winding being carried for angular motion by a shaft 270 having a pinion 271 thereon, a speed reduction gear system 272 being interposed between pinion 271 and gear 261 whereby upon initial operation of motor 248, rotor winding 269 will be displaced from a normally null position whereupon a signal is induced within the rotor winding.

The electric signal so induced is communicated by suitable leads 273 across a resistor 274 (Figure 4), mounted within the servo adapter, grounded at one side and having an adjustable contact 275 therefor, the latter being connected to a lead 276 whereby the follow-back signal is impressed upon the bank signal at grid 228 of tube 229 so that the operation of motor 248 is proportional to the algebraic sum of the bank and follow-back signals. By adjusting contact 275 relative to resistor 274 the proper factor between aileron angle and signal voltage may be varied at will. Reversing switch 246 between the output of secondary windings 243 of the two magnetic reactors and the variable phase of motor 248 is provided to initially establish the correct direction of rotation of the motor. Reversing switch 133 of the first network serves the same general purpose in connection with rudder motor 102.

For generating an electric signal at the gyro horizon proportional to the angle of craft pitch, an inductive device 277 is provided comprising a fixed stator 278 having thereon two windings 279 and 280 wound in series opposed relation and provided with three taps or leads 281, 282, 283 which are connected across the craft's source of alternating current. A rotor 284 in the form of a soft iron core is carried by trunnion 297 and normally is positioned relative to the stator windings in such a manner that the induced currents in the stator are equal and opposite and the system is balanced. As soon, however, as craft pitch occurs, vane rotor 284 is moved angularly relative to the stator to unbalance the voltages therein whereby a signal is generated at the stator which reverses in phase as it passes through zero, defined by craft climb or dive.

A suitable inductive receiving device 285 is provided having a three phase wound stator 286 which connects with transmitter stator 279 by way of leads 281, 282, 283. A rotor winding 287 is inductively coupled with the receiver stator and is mounted for angular motion relative to the latter stator by way of a shaft 288. Upon the development of a craft pitch condition, rotor vane 284 is displaced angularly and the voltages within the transmitter stator windings 279, 280 are unbalanced causing a like unbalance within receiver stator 286. With the condition of unbalance within the stator windings, the electrical axis of rotor winding 287 is at some relation other than normal to the resultant of the magnetic field at the stator so that a signal is induced within the rotor winding proportional to the craft pitch.

Figure 3:
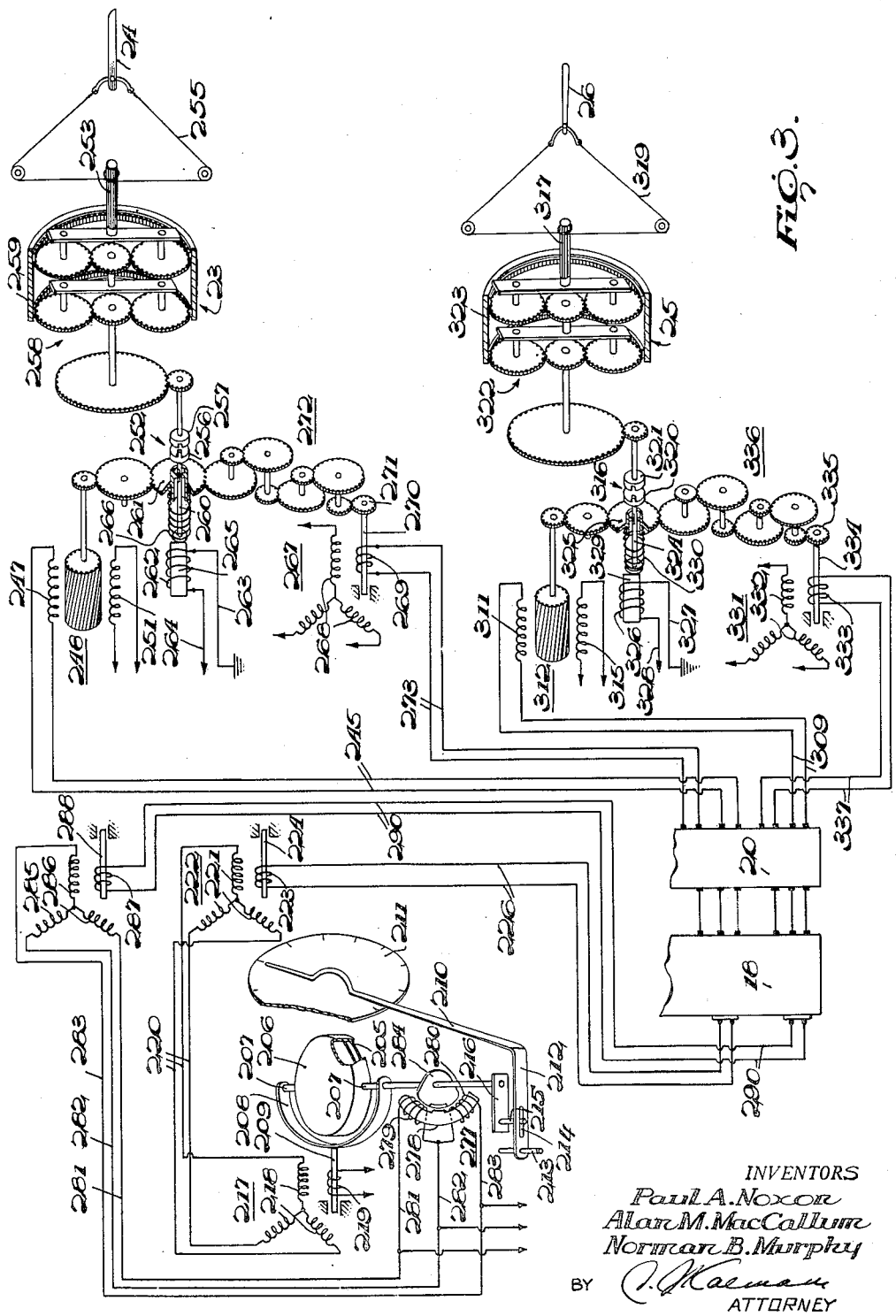
Figure 3 is a view similar to that of Figure 2 illustrating the aileron and elevator control systems; and, Figure 4 is a wiring diagram of the novel amplier system used with the present invention.

The electric signal, thus generated, is communicated by way of leads 290, across a resistor 291 of the servo amplifier (Figure 4), and impressed upon a grid 292 of a vacuum tube 293, the plate 294 of which connects through two parallel paths with grids 295 and 296 of tubes 297 and 298. Plates 299 and 300 of the latter tubes connect by way of conductors 301 across conductors 115, 116 with opposite ends of split secondary winding 117. As in the preceding two networks, magnetic reactors 302 and 303 are provided between each of the plate circuits and comprise soft iron cores (not shown) having wound thereon a pair of primary windings 304 and 305 connected in series with each other and with the craft's source of alternating current by way of leads 306 tapped to conductors 119, 120 of the transformer primary 118. Also provided, are secondary windings 307 and 308 which are connected in series opposed relation and have output leads 309 which connect through a reversing switch 310, mounted within the servo adapter, with one phase winding 311 of a two phase induction motor 312 provided for controlling elevator surfaces 26 (Figure 3). Saturating windings 313 and 314 (Figure 4) are provided for each reactor, the function of each winding being to determine the direction of rotation of motor 312.

In a manner similar to that described in connection with the rudder and aileron networks, the pitch signal, depending upon whether it be climb or dive, will generate a pulsating current within one or the other of saturating windings 313 or 314 so that the induced currents within either secondary winding 307 or 308 are decreased and current will flow in one direction or another at output leads 309 to energize phase 311 of motor 312, the second phase 315 thereof being continually energized from the craft's source of alternating current.

As in the case of rudder and aileron control, a servo clutch 316 is provided for establishing a driving connection between motor 312 and an elevator control shaft 317, the latter being drivably connected to elevator surfaces 26 by way of suitable cables 319. Clutch 316 comprises two clutch faces 320 and 321, one of which drivably connects with elevator control shaft 317 through suitable reduction gearing 322, which is similar to the reduction gearing described in connection with the first two control axes, supported within a stationary servo casing 323, and the other of which is carried by a shaft 324 adapted for axial movement relative to a gear 325 keyed for rotation therewith. A solenoid 326, having one end grounded by means of a lead 327 and connected with servo clutch switch 92 by way of a lead 328, is energized when the switch is in its "on" position whereupon solenoid core 329 is urged outwardly, against the action of a yieldable member 330, interposed between gear 325 and an enlarged portion of shaft 324, to energize and move shaft 324 outwardly to urge clutch face 320 into driving engagement with clutch face 321.

In order to dampen the movement of the elevator surfaces, an inductive follow-back device 331 is provided having a three phase wound stator 332, connected to the craft's supply of alternating current, and a rotor winding 333 inductively associated therewith, the rotor winding being carried for angular motion by a shaft 334 having a pinion 335 thereon, a speed reduction gear system 336 being interposed between pinion 335 and gear 325 whereby upon initial operation of motor 312, rotor winding 333 will be displaced from a normally null position whereupon a signal is induced within the rotor winding.

The electric follow-back signal thus induced is communicated by suitable leads 337 across a resistor 338 (Figure 4), which is mounted within the servo adapter and grounded at one side, and which is provided with an adjustable contact 339, the latter being connected to a lead 340 whereby the follow-back signal is impressed upon grid 292 and there superimposed upon the pitch signal. By adjusting contact 339 relative to resistor 338 the proper factor between elevator angle and signal voltage may be readily acquired. Reversing switch 310 between the output of the secondary windings of the two reactors and the variable phase of motor 312 is provided for initially establishing the correct direction of rotation of the motor.

From the foregoing, it is noted that no rate signal is superimposed upon the pitch and bank signals as this normally is not needed since the system is self dampening. However, if it should be desired to utilize rate signals, auxiliary taps 341 and 342 (see Figure 4) are provided for accommodating such signals and impressing them upon grids 228 and 292 of tubes 229 and 293. Moreover, an accessory tap 343 is also provided in the direction signal network whereby, if desired, a direction signal may be obtained from a conventional radio compass, for example, instead of the pick-up device. This substitution of any desired directional signal entails no mechanical changes within the pilot system, but merely involves the disconnection of the pick-up signal and a connection from the radio compass whereby the signal of the latter can be impressed directly on grid 104 of tube 105.

Operation

It may be assumed that the craft, upon which the present novel automatic pilot is provided, has been flying a prescribed level course under the manual control of the human pilot and that the latter desires to place the craft under the control of the automatic pilot to automatically maintain the craft upon the prescribed course.

If power switch 94 is not already in its "on" position, it is operated to that position and servo clutch switch 92 is also operated to its "on" position. Coil 85 of the magnetic clutch between the inductive coupling device 43 and the inductive transmitting device 82 is energized to bring clutch faces 86—87 into driving engagement whereby any motion of rotor shaft 50 is immediately transmitted to rotor shaft 84. Simultaneously, servo clutch solenoids 141, 262 and 326 are energized establishing driving connections between induction motors 102, 248 and 312 and their corresponding control surfaces, i. e., rudder 22, ailerons 24 and elevators 26.

Should the craft, for some reason, deviate from its prescribed course, the voltages induced within secondary coil 37 of the pick-up device will be changed proportionately to the amount of craft departure from course and the change in voltages is reproduced within stator windings 42 of the inductive coupling device. A change in the resultant magnetic field of the stator is thereby developed which causes the induction of an electric signal within rotor winding 49. The rotor signal is led off by leads 51 to amplifier 16 wherein it is amplified and fed by leads 52 to variable phase 53 of motor 54, the latter being energized, drives rotor winding 49 to a new null position, through speed reduction gearing 68, in which position the signal disappears and motor 54 becomes de-energized.

Angular motion of rotor winding 49 from its original null position to the new null produces angular motion of rotor 83 of the inductive transmitting device and the latter stops in a new angular position relative to its stator when rotor winding 49 has reached its new null position. Rotor winding 83 being off its null position, has a signal induced therein which is led to and amplified within servo amplifier 18 and led out therefrom through servo adapter 20 to energize variable phase 134 of servo induction motor 102 which drives rudder surface 22 outwardly and simultaneously offsets rotor winding 173 of inductive follow-back device 171 relative to its stator 172 whereby a follow-back electrical signal is generated within the rotor winding and is communicated to amplifier 18 to be impressed upon the direction signal which it opposes in direction. As soon as the follow-back signal is equal and opposite to the direction signal, induction motor 102 stops with rudder 22 displaced a given amount relative to the craft. As the craft begins to swing back to its course the direction signal diminishes in value and the follow-back signal predominates so that, as a result of the latter signal, motor 102 is operated in a reverse direction to swing rudder 22 back to a normal position and to simultaneously move rotor winding 173 of the inductive follow-back device to its null position whereupon motor 102 is de-energized.

With initial craft deviation from a prescribed course, rate gyro 184 precesses against the yieldable action of members 189 to angularly move rotor winding 192, of inductive transmitting device 190, from a null position whereupon a change in voltages occurs within the windings of stator 198, the change being communicated to stator windings 200 of receiver device 201 and causing a signal to be induced in rotor winding 202. This signal is proportional to the rate of craft turn and is communicated to amplifier 18 and there superimposed upon the direction signal to aid the latter and oppose the follow-back signal whereby the rudder is swung outwardly more rapidly. Motor 102 operates to increase rudder deflection until the follow-back signal is equal and opposite to the direction and rate signals whereupon motor 102 is de-energized. The craft stops momentarily and the rate signal, at that moment, drops to zero. As the craft begins to return to its course, the direction signal diminishes and the follow-back signal becomes predominating to reverse operation of the motor whereby the rudder is operated toward its neutral position. As the craft returns to its course, it develops an angular velocity in a reverse direction and the rate signal developed as a result thereof now aids the follow-back signal and opposes the direction signal to hasten the return of the rudder to neutral.

The rudder may attain neutral, causing the follow-back signal to drop to zero, prior to the time that the craft has actually attained its prescribed course. If the craft still possesses angular velocity in the direction of return, motor 102 continues to operate under the influence of the rate signal alone. At the same time, however, rotor winding 173 of the inductive follow-back device is moved from its null in an opposite direction whereupon a follow-back signal is generated which now opposes the rate signal. In this manner, a reverse rudder is applied prior to the craft's attainment of course acting to brake and dampen the craft to prevent overswing as it attains its course. As the rate signal disappears, the follow-back signal acts to bring the rudder back to neutral at which time the follow-back signal drops to zero and a synchronous relation is maintained between the direction signal producing means and the rudder without a direct mechanical follow-up connection therebetween.

Substantially the same operation takes place in connection with the pitch axis so that upon craft pitch from a prescribed attitude, whether level or inclined, a signal proportional thereto is generated in stator windings 279, 280, reproduced by rotor 287 of the receiver and communicated through the amplifier to cause operation of elevator motor 312 to operate elevator surfaces 26. With operation of motor 312, rotor winding 333 of inductive follow-back device 331 is displaced angularly relative to its stator whereby a follow-back signal is generated which is impressed upon the pitch signal until it is equal and opposite to the pitch signal whereupon the motor is de-energized. As the craft starts to return to its prescribed attitude, the pitch signal diminishes and the follow-back signal predominates to reverse motor 312 until elevator surfaces 26 are returned to neutral wherein the follow-back signal drops to zero.

Upon craft bank, rotor 219 of inductive device 217 is displaced angularly thereby developing a signal within rotor winding 223 of the receiver, proportional to the angle of craft bank, the signal passing through amplifier 18 to energize motor 248 whereupon aileron surfaces 24 are deflected in one direction or another depending upon the direction of bank. With operation of motor 248, rotor winding 269 of follow-back device 267 is displaced angularly whereby a follow-back signal is generated and impressed upon the bank signal to modify the operation of motor 248 and eventually to de-energize the motor when the follow-back signal is equal and opposite to the bank signal. As the craft stops and begins to return to its prescribed attitude, the bank signal diminishes and the follow-back signal predominates to reverse operation of motor 248 to return ailerons 24 to neutral. As the ailerons approach their neutral position, the follow-back signal drops to zero and motor 248 is de-energized. As in the case of rudder control, a synchronous relation is maintained between the pitch and bank signal elements and the elevator and aileron surfaces without a direct mechanical follow-up connection therebetween.

If desired, a pilot's emergency switch 400 may also be provided, which may be located on the pilot's wheel, so that if it is desired to de-energize the servo clutches, the pilot need merely depress a button 401 which connects a coil 402 to ground thereby energizing the coil whereupon a core 403 is urged outwardly to open servo clutch switch 92. As soon as switch 92 is de-energized, coil 402 is de-energized but does not close switch 92, the latter requiring a direct operation of switch 92.

It will now be apparent that a novel automatic steering system has been provided which holds the craft, without resetting, on any desired magnetic course, returns it rapidly when displaced from that course, without overswing or oscillation and, at the same time, keeps the craft accurately trimmed in pitch and bank. The extreme sensitivity of the automatic pilot of the present invention, together with its rapidity of response to small displacements, make large movements of the control surfaces unnecessary. At the same time, because of its freedom from all tendency to oscillate about course, the automatic pilot is able to hold the craft stable under widely varying weather conditions, and do so without adjustment.

Although but a single embodiment of the invention has been illustrated and described in detail for controlling an aircraft about all three of its axes, it is to be expressly understood that the invention is not limited thereto. Various changes may also be made in the design and arrangement of the parts without departing from the spirit and scope of the invention as the same will now be understood by those skilled in the art. For example, instead of utilizing a separate artificial horizon gyro as the take-off means for the pitch and bank signals, the artificial horizon utilized as the stabilizing means for the magnetic field pick-up device may be so used. For a definition of the limits of the present invention reference will be had primarily to the appended claims.

What is claimed is:

1. In an automatic control device for a craft having a control surface movable with respect thereto for controlling said craft about an axis thereof, a servo motor normally disconnected from said surface but adapted for connection thereto for the operation thereof, means for connecting said servo motor to said surface, reference means on said craft for generating an electric signal in response to a departure of said craft from a predetermined position to energize said motor, means connected to said motor for operation thereby for producing a second electric signal in response to a departure of said craft from said predetermined position, and means for algebraically combining said signals to control the operation of said motor whether the latter is connected to or disconnected from said surface.

2. An automatic pilot for an aircraft having a control surface movable with respect thereto, comprising a servo motor normally disconnected from said surface but adapted for connection thereto for the operation thereof, means for connecting said servo motor to said surface, reference means on said craft for generating an electric signal in response to a departure of said craft from a predetermined position to operate said motor, means permanently connected to said motor for operation thereby for generating a second electric signal, and amplifier means for algebraically combining said signals to modify the operation of said motor whether the latter is connected to or disconnected from said surface.

3. An automatic pilot for an aircraft having a control surface movable with respect thereto, comprising a servo motor normally disconnected from said surface but adapted for connection thereto for the operation thereof, means for connecting said servo motor to said surface, reference means for said craft producing an electric signal in response to a departure by said craft from a predetermined position to operate said motor, inductive means connected to said motor for operation thereby for producing a second electric signal in response to a departure by said craft from said predetermined position, and means for combining said signals to modify the operation of said motor whether the latter is connected to or disconnected from said surface.

4. An automatic steering system for dirigible craft, including a control surface, an induction motor normally disconnected from said surface but adapted for connection thereto for the operation thereof, means for connecting said motor to said surface, reference means for producing an electric signal in response to a departure of said craft from a predetermined course to energize said motor whereby said surface is moved, means comprising a device having a stator portion and an angularly movable rotor portion inductively coupled therewith, said rotor portion being connected for angular movement by said motor for generating a second electric signal, and amplifier means for combining said signals to modify the operation of said motor.

5. An automatic steering system for dirigible craft, including a control surface, an induction motor normally disconnected from said surface but adapted for connection thereto for the operation thereof, means for connecting said motor to said surface, reference means for producing an electric signal in response to a departure of said craft from a predetermined course to energize said motor whereby said surface is moved, means comprising a device having a stator portion and an angularly movable rotor portion inductively coupled therewith, said rotor portion being connected for angular movement by said motor for generating a second electric signal, means for adjusting the value of said second signal, and amplifier means for combining said signals to modify the operation of said motor.

6. An automatic steering system for dirigible craft, including a control surface, driving means for operating said surface, reference means for producing an electric signal in response to a departure of said craft from a predetermined course to energize said driving means, means connected for operation by said driving means for producing a second electric signal, means for generating a third electric signal in response to the angular rate of departure of said craft from said predetermined course, and thermionic means for combining said three signals to modify the operation of said driving means.

7. An automatic steering system for dirigible craft, including a control surface, an induction motor for operating said surface, reference means for producing an electric signal in response to a departure by said craft from a predetermined course to energize said motor, inductive means operated by said motor for producing a second electric signal, means for adjusting the intensity of said second signal, means for generating a third electric signal in response to the angular rate of departure of said craft from said predetermined course, means for adjusting the intensity of said third signal, and thermionic means for combining said three signals to modify the operation of said motor.

8. An automatic steering system for dirigible craft, including a control surface, a two phase induction motor for operating said surface, one of the phases being constantly energized, reference means for producing an electric signal in response to a departure of said craft from a predetermined course to energize the other phase of said motor, means operated by said motor for producing a second electric signal, means for generating a third electric signal in response to the angular rate of departure of said craft from said predetermined course, and means for combining said three signals to be impressed upon said other motor phase to thereby modify the operation of said motor.

9. An automatic steering system for dirigible craft, comprising a control surface, a servo motor for operating said surface, reference means for producing a first electric signal in response to a departure of said craft from a predetermined course to energize said motor to operate said surface, means operated by said motor for producing a second electric signal, means for generating a third electric signal in response to the angular rate of departure of said craft from said predetermined course, and means for algebraically combining said signals to modify the operation of said motor, said third signal aiding said first signal and opposing said second signal upon initial departure of said craft from said predetermined course and opposing said first signal and aiding said second signal when the craft is returning to its predetermined course.

10. An automatic steering system for dirigible craft, comprising a rudder, a servo motor for operating said rudder, means comprising a magnetic pick-up device carried by said craft and disposed in the earth's magnetic field for producing an electric signal in response to relative displacement of said pick-up device with respect to said earth's magnetic field due to a departure of said craft from a predetermined course to energize said motor, a variable inductive device operated by said motor for producing a second electric signal, rate-of-turn responsive means for producing a third electric signal proportional to the angular rate of departure of said craft from said predetermined course, and means comprising a vacuum tube amplifier or algebraically combining said signals to modify the operation of said motor, said third signal aiding said first signal and opposing said second signal upon initial departure of said craft from said predetermined course and opposing said first signal and aiding said second signal when said craft is returning to said course.

11. An automatic steering system for dirigible craft, comprising a rudder, an induction motor for operating said rudder, means comprising a magnetic pick-up device carried by said craft and disposed in the earth's magnetic field for producing an electric signal in response to relative displacement of said pick-up device with respect to said earth's magnetic field due to a departure of said craft from a predetermined course to energize said motor, a variable inductive device operated by said motor for producing a second electric signal, rate-of-turn responsive means for producing a third electric signal proportional to the angular rate of departure of said craft from said predetermined course, and amplifier means for algebraically combining said three signals to modify the operation of said motor, said third signal aiding said first signal and opposing said second signal upon initial departure of said craft from said predetermined course and opposing said first signal and aiding said second signal when said craft starts to return to said predetermined course.

12. An automatic steering system for dirigible craft, comprising a control surface, a servo motor normally disconnected from said surface but adapted for connection thereto for the operation thereof, means for drivably connecting said servo motor to said surface, reference means for producing an electric signal in response to a departure of said craft from a predetermined position to energize said motor, and means mechanically connected to said motor for operation thereby whether the motor is connected to or disconnected from said surface for producing a second electric signal for modifying the operation of said motor, whereby synchronous operation of the reference means and the control surface is maintained without a mechanical follow-up connection between the control surface and the reference means.

13. An automatic steering system for dirigible craft comprising a control surface, an induction motor normally disconnected from said surface but adapted for connection thereto for the operation thereof, means for drivably connecting said motor to said surface, reference means for producing an electric signal in response to a departure by said craft from a predetermined course to energize said motor, and inductive means connected for operation by said motor for producing a second electric signal for modifying the operation of said motor whether the latter is connected to or disconnected from said surface whereby synchronous operation of said reference means and the control surface is maintained without a mechanical follow-up connection between the control surface and the reference means.

14. The combination with a dirigible craft having a movable control surface thereon adapted for either manual or automatic operation, of automatic steering means for said craft comprising a servo motor adapted for connection to said surface for automatically steering said craft and adapted to be disconnected from said surface when the latter is to be operated manually, selectively operable control means for drivably connecting said servomotor to said surface and for disconnecting the motor from said surface, reference means on said craft for generating a signal to energize said motor in response to a departure of said craft from a predetermined position when the surface has been operated manually with the motor disconnected from the surface, and means connected to said motor for generating a second signal in response to operation thereof for combining with said first signal to modify the operation of said motor whereby said motor follows the movement of said surface when it is disconnected from said surface.

15. The combination with a dirigible craft having a movable control surface thereon adapted for either manual or automatic operation, of automatic steering means for said craft comprising a servo motor adapted for connection to said surface for automatically steering said craft and adapted to be disconnected from said surface when the latter is to be operated manually, selectively operable control means for drivably connecting said servomotor to said surface and for disconnecting the motor from said surface, reference means on said craft for generating an electric signal to energize said motor in response to a departure of said craft from a predetermined position when the surface has been operated manually with the motor disconnected from the surface, and means mechanically connected to said motor for producing a second electric signal in response to the operation thereof for combining with said first signal to modify the operation of said motor whereby said motor follows the movement of said surface when it is disconnected from said surface.

16. An automatic steering system for a craft having a rudder, comprising an inductive device having a multi-circuit stator winding and a single circuit rotor winding in inductive relation with the stator winding, a two-phase alternating current driving motor connected to actuate the rotor winding of said inductive device, a source of alternating current, means connecting said source to energize one phase of said driving motor, direction responsive means comprising an induction device including a multi-circuit winding connected to the multi-circuit winding of said inductive device and a single circuit winding energized by said source of alternating current, whereby another alternating current is generated in the multi-circuit winding of said induction device, means connecting the rotor winding of said inductive device to energize the other phase of said driving motor, whereby the latter rotates to actuate the rotor winding of said inductive device upon relative angular displacement of said direction responsive means in azimuth, an electrical transmitting device connected to said driving motor for transmitting an electrical signal proportional to the relative angular displacement of said direction responsive means, a two-phase alternating current servo-motor drivably connected to actuate the rudder of the craft, means for energizing one phase of said servo-motor, means including a signal amplifier connecting said signal transmitting device to energize the other phase of said servo motor, whereby the latter actuates said rudder in accordance with the relative angular displacement of said direction responsive means, means actuated by said servo-motor for producing a follow-up signal proportional to the angular displacement of said rudder, and means constituting an electrical follow-up connection between said directional signal transmitting means and said rudder for applying said follow-up signal to the input of said signal amplifier in opposition to said direction signal whereby the relative displacement of said rudder is maintained in synchronism with the relative displacement of said direction responsive means.

17. In an automatic steering system for dirigible craft provided with a control surface and an induction motor for operating the surface, reference means for producing an electric signal in response to a departure by said craft from a predetermined course to energize the motor, inductive means operated by said motor for producing a second electric signal, means for generating a third electric signal in response to the angular rate of departure of said craft from said predetermined course, and vacuum tube amplifier means for combining said three signals to modify the operation of said motor.

18. Apparatus for selectively controlling the attitude of a craft in accordance with a signal and permitting direct manual control of the craft, comprising an attitude-responsive device for supplying a voltage component varying in response to variations of attitude of the craft, means for producing a variable voltage component, a servo mechanism responsive to said attitude-responsive voltage component and said variable voltage component for varying the attitude of said craft in accordance with relative variations of said components, and means for disabling said servo mechanism from controlling the attitude of said craft and varying said variable voltage component in accordance with said attitude-responsive voltage component during the period during which said servo mechanism is disabled.

19. In an automatic pilot for dirigible craft having a control surface normally adapted for manual operation, a servo-motor adapted for operative connection to said surface, reference means carried by said craft for producing an electric signal when said craft departs from a predetermined position in response to manual operation of said control surface for energizing said servo-motor, means for connecting said motor to and disconnecting it from said surface, and means operative when said motor is disconnected from said surface for automatically synchronizing said motor with said reference means so that subsequent to manual control of said surface to change craft position the motor, upon connection to said surface, operates said surface only when a signal is developed by said reference means as a result of deviation of said craft from said last-named position.

PAUL A. NOXON.
ALAN M. MacCALLUM.
NORMAN B. MURPHY.

REFERENCES CITED

The following references are of record in the file of this patent:

UNITED STATES PATENTS

| Number | Name | Date |
|---|---|---|
| 1,360,694 | Sperry | Nov. 30, 1920 |
| 1,703,280 | Minorsky | Feb. 26, 1929 |
| 1,958,258 | Alexanderson | May 8, 1934 |
| 1,958,259 | Becker | May 8, 1934 |
| 1,973,279 | Bernarde | Sept. 11, 1934 |
| 2,134,901 | Wey | Nov. 1, 1938 |
| 2,234,326 | Tiebel | Mar. 11, 1941 |
| 2,310,954 | Hodgman | Feb. 16, 1943 |
| 2,351,977 | Kronenberger et al. | June 20, 1944 |
| 2,356,597 | Kronenberger | Aug. 22, 1944 |
| 2,416,097 | Hansen et al. | Feb. 18, 1947 |